United States Patent

[11] 3,558,821

[72] Inventors Roman Lutz; Herbert Vogl, Munich, Germany
[21] Appl. No. 794,028
[22] Filed Jan. 27, 1969
[45] Patented Jan. 26, 1971
[73] Assignee Siemens Aktiengesellschaft Berlin and Munich, Germany a corporation of Germany
[32] Priority Feb. 12, 1968
[33] Switzerland
[31] 2,066/68

[54] TELEPRINTER DEVICE UTILIZING RECEIVER FORMED FROM ELECTRONIC CIRCUITS

7 Claims, 7 Drawing Figs.

[52] U.S. Cl. 178/17.5, 178/17
[51] Int. Cl. H04l 13/08, H04l 15/24
[50] Field of Search 178/17.5, 17, 17C, 88

[56] References Cited

UNITED STATES PATENTS

| | | | |
|---|---|---|---|
| 3,407,389 | 10/1968 | Klein | 340/172.5 |
| 3,439,119 | 4/1969 | Gehrmann | 178/17.5 |

*Primary Examiner*—Kathleen H. Claffy
*Assistant Examiner*—Charles W. Jirauch
*Attorney*—Hill, Sherman, Meroni, Gross & Simpson

ABSTRACT: A teleprinter device utilizing a receiver formed from electronic circuits and constructed as a shift register, for use with an electromechanical printing mechanism, and employing a frequency generator which is adjustable to provide various operating speeds, the shift register having shift, start and reset circuits which are cooperable with a blocking circuit connected to said shift register to prevent further change, following entry of the last symbol step, in the shift register until release thereof in response to a control impulse, whereby the data is stored in the register, from the middle of the last symbol step, for a period of 1.25 step lengths.

INVENTORS
Roman Lutz
Herbert Vogl

BY Hill, Sherman, Meroni, Gross & Simpson ATTYS.

INVENTORS
Roman Lutz
Herbert Vogl

BY Hill, Sherman, Meroni, Gross & Simpson ATTYS.

INVENTORS
Roman Lutz
Herbert Vogl

BY ATTYS.

TELEPRINTER DEVICE UTILIZING RECEIVER FORMED FROM ELECTRONIC CIRCUITS

BACKGROUND OF THE INVENTION

Field of the Invention

The invention is directed to teleprinter devices, particularly a receiver therefor which is formed from electronic circuits, as well as to a circuit for use in electromechanical printing mechanisms which is adjustable to various receiving and/or transmission speeds, whereby the cyclic frequency is produced by a frequency-generating circuit which may be selectively controlled to effect the various desired speeds.

There is known in the art a receiving system for electronic teleprinting mechanisms in which a start-stop generator is used as an impulse generator, which readies the necessary cyclic impulses through a number of divider stages. In this arrangement the matrix generator is designed as a multivibrator and is selectively adjustable in frequency for varying the speed of the mechanism. Such known electronic teleprinting mechanism employs a dual counter which distributes the symbol impulses of the teleprinter combinations over coincidence circuits and storage stages controlled by the coincidence circuits and the incoming symbols. The teleprinter signals are stored in such storage stages during the duration of the blocking and starting stage, for transfer to the printing mechanism. However, it is disadvantageous that the time for the starting and blocking step is not determined precisely, and in addition the expense for a separate storer and dual counter in such known system is relatively high.

SUMMARY OF THE INVENTION

The invention is directed to the problem of producing an electronic teleprinting circuit which although relatively low in cost provides the best possible reception. As impulse transmitters implying a start-stop generator possess a certain amount of inaccuracy, the utilization of such a circuit is not employed in the solution to the problems involved. Furthermore, the present invention is directed to the production of an electronic teleprinting circuit which, by means of simple switching operations can be changed over to any one of a plurality of speeds, for example, 50, 75 and 100 Baud.

In the present invention, the receiver is designed as a shift register with the scanning of the starting phase and the cyclic time of the receiver being so controlled, by an impulse signal with twice the frequency of the step impulse, that with the aid of a blocking circuit the data is stored in the register from the middle of the fifth step for a length of time equivalent to 1.25 step lengths. In accordance with one embodiment of the invention, a crystal controlled oscillator is provided which has an output of 24kHz., from which the impulse frequency is derived by means of a chain of divider stages, one or two of which are disconnectable or switchable to provide impulses in accordance with desired corresponding telegraph speeds, for example 50, 75 and 100 Baud, with the desired impulse frequency effecting a forward shifting of the shift register forming the receiver. In a further embodiment, the divider stages which reduce the frequency of the crystal controlled generator to the desired step impulse frequency as well as a double step frequency, additional multiples are derived which may be utilized for the starting step test, if necessary in connection with a false-start blocking function.

Simplification of the operations can be accomplished by providing means operative in the event a switching is effected to "local operation" to positively switch to the maximum speed, for example 100 Baud, and upon switching back to line operation effects a positive return to the previously selected speed for line operation.

In a preferred embodiment of the invention, the operation of the printing mechanism may be permanently set for start-stop operation at the highest settable telegraph speed, for example 100 Baud, so that at a lower telegraphic speed only the waiting time between releases is increased.

In accordance with a further feature of the invention, provision may be made to reduce distortions by an arrangement in which one or several divider stages are so controlled by "erasure" or "resetting" operations that with each start of the receiver the first timing impulse period is shortened, for example by reducing the transmission ratio of one divider in the first transmission reducing cycle to only 39:1 instead of 40:1, so that a trailing distortion is converted into a bilateral distortion of half the absolute maximum value of the trailing distortion.

Other features and objects of the invention will be apparent to those skilled in the art from the disclosure herein given.

BRIEF DESCRIPTION OF THE DRAWINGS

In the drawings wherein like reference characters indicate like or corresponding parts:

FIGS. 3*a* and *b* are impulse diagrams which are explanatory of the manner in which one-sided distortions are converted into bilateral distortions of half the original maximum value, while

DETAILED DESCRIPTION OF THE INVENTION

Figure 1:
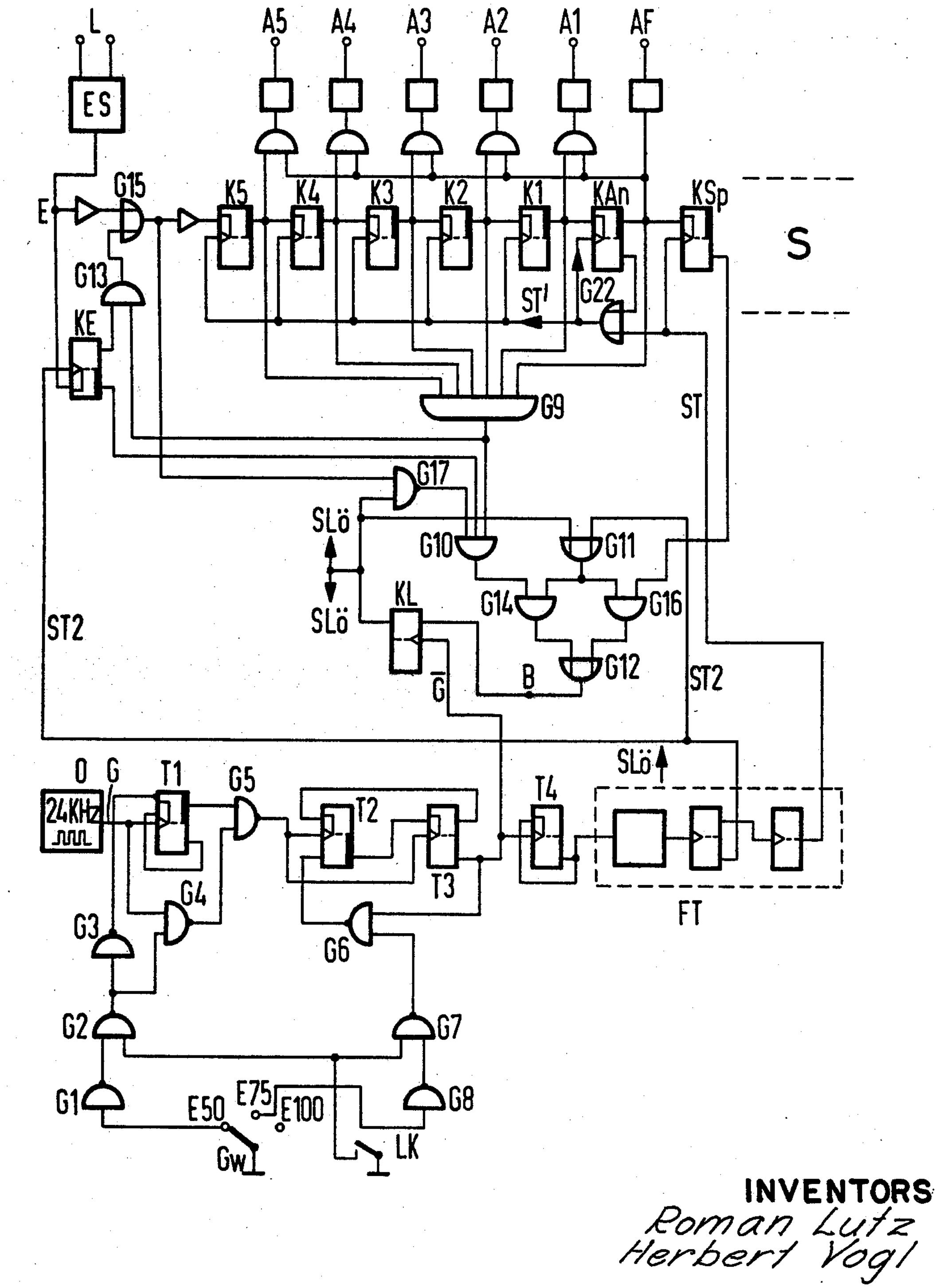
FIG. 1 is a block circuit diagram of a teleprinter receiver constructed in accordance with the invention, FIGS. 2*a*, *b* and *c* are diagrams illustrating the relationship between various impulses in the circuit illustrated in FIG. 1.

Referring to FIG. 1, the reference letter L designates the connecting line over which the teletype symbols are received, which line is connected to an input circuit containing a telegraph relay or corresponding electronic circuit arrangement identified as ES operative to convert the incoming signals to so-called logic signals appearing at the point E, in which spacing current = 1 and marking current = 0. From the point E the incoming teletype signals are fed, over gate G15 to the shift register S which comprises flip stages K1 to K5 and KA*n* and KS*p*. The rest position of the shift register S and thus of the entire receiver is positively effected by an erasure or resetting circuit comprising the gates G9, G10, G11, G12, G14, G16 and G17 and the flip stage KL. It should be particularly noted that the output of the flip stage KL, designated SL*o* is connected to the static resetting inputs of all the other flip stages K and the divider FT. However, for the purposes of simplicity and clarity such connections are not illustrated in FIG. 1.

If spacing current (1) exists at the terminals L, the flip stages K1 to K5, KAN, KSP and the input flip stage KE occupy the positions illustrated in FIG. 1. The signal "1" thus appears at the inputs and outputs of gates G9 and G10. Consequently the erase flip stage KL, controlled by the OR gate G12 is in "erase" position and as previously mentioned, the output SL*o* of the flip stage KL is connected to the static reset inputs of all of the other flip stages designated by the letter K.

When a starting step is received at the input circuit ES the logic signal "0 appears at the point E, the gates G10, G12, G14 and G17 effect a disconnection of the preparation for the erasing and upon the positive flank of the immediately following generator impulse G the flip stage KL effects a disconnection of the erase signal to the other register stages K. Simultaneously therewith the frequency divider FT is released, which causes a frequency division in a ratio of 1:40, so that the impulse signal ST and/or the impulse signal ST′ is supplied to the shift register S over gate G22. The frequency divider FT, the details of which will be subsequently described, is preceded by four additional frequency divider stages T1 to T4 which may be suitably switched in accordance with the desired telegraphing speed, which circuit arrangement will likewise be subsequently described in detail.

The matrix generator O, for example a crystal-controlled generator, is operative to produce a signal G with a frequency of 25 kHz.

When a starting step of normal length is received, the logic signal "0" is entered at the center of the starting step in a known manner into the flip stage K5 in response to an impulse over the lines ST and ST′ and will be shifted ahead through the following flip stages with the subsequent impulse signals appearing on such lines until eventually the last place stage KS*p* is reached, and upon flipping thereof a signal "1" is fed to the gate G16. However, referring to FIG. 2, it will be noted that at such instant the impulse signal ST2 is precisely "0" and the shut down of the cyclic receiver formed by the shift register S can take place only over gate G12 1/4 step later which is 6¾ step lengths after the initial scanning of the starting step.

The respective data steps following the starting step will have been completely recorded in the register S with the sixth shifting impulse which is operative to flip the flip stage KA*n* resulting in the application of a blocking signal over the gate G22 and line ST′, to the stages K1 to K5 whereby no further triggering of such stages can take place until an erasure has been effected. Consequently, the data is available at the outputs A1 to A5 and AF for the duration of 1¼ step lengths, from which the signals can be transferred into a printing mechanism.

An additional flip stage KE is provided for transferring the starting step into the flip stage K5, the stage KE releasing a repeat scanning of the starting step after a period corresponding to one quarter step interval, and conditionally initiating the start of the receiver in the presence of the logic signal "0" at the point E. If the starting step is longer than one quarter of a step length, the logic signal "0" is supplied to the flip stage K5 over the OR gate G15 regardless whether or not a signal corresponding to a symbol step is present at point E at the time of the step center.

The start of the receiver thus becomes absolute only when at the time "one-quarter step" symbol potential remains present at the input. The receiver also stops at this point in the event of a faulty scanning, but following a renewed start it still can correctly scan the data steps as the distortion only amounts to 25 percent. In any event the symbol frequency is not disturbed thereby. As explained previously, the stopping of the receiver takes place at 6¾ step lengths which assures that even at unfavorable step lengths (alternating symbols R,Y) a rapid phasing-in is still possible. Only at the end of the complete cycle will the data be erased from the shift register. It is thus available from the middle of the fifth step until ¾ of the length of the blocking step or in other words for a period of 1¼ step lengths. This time is still adequate at a speed of 100 Baud for effecting actuation of known types of printing mechanisms. It will be particularly noted that this is accomplished without the disadvantage of providing an additional intermediate storer.

In the event of an interruption on the line (starting step smaller than one quarter of the step length) the cyclic shifting of the receiver is erased after a time corresponding to one quarter impulse.

It is possible that even at a normal starting step the receiver is shut down erroneously due to a disturbance (logic "1") during the starting phase, for example at one-quarter of the starting step. However, if the starting step remains connected following the disturbance, the receiver will start anew and will still scan the symbol correctly with a 25 percent distortion. At the point one-quarter step over gate G17, and in dependence upon the position of the flip stage KE a clear decision is reached. If at this point the flip stage KE has not yet been changed, an erasure is released in all cases, regardless of whether the criterion again changes at point E or whether spacing polarity exists.

Figure 2A:
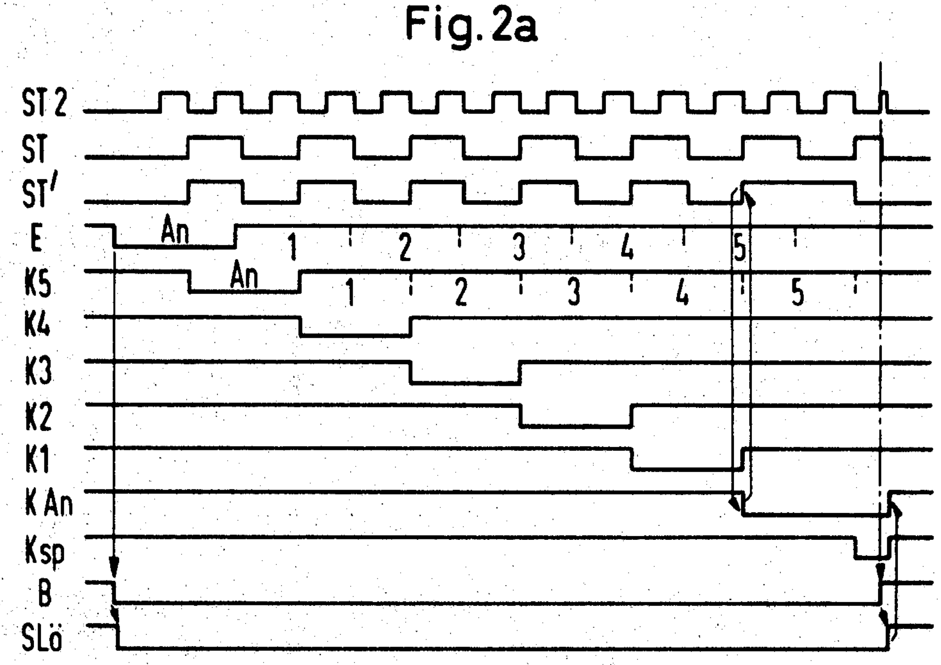
Figure 2B:
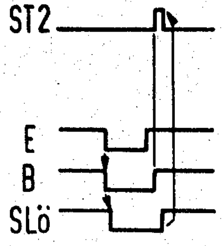
Figure 2C:
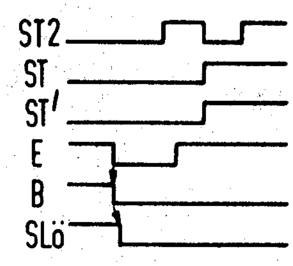

FIG. 2*a* illustrates an impulse diagram for the receiver when a normal starting step is received for an individual teletype symbol, following the same through the circuit. FIG. 2*b* illustrates the conditions which occur in the case of a subsequent shut down of the receiver while FIG. 2*c* illustrates the case of a start following ¼ step.

Expediently the operating shaft of the mechanical printing mechanism is rotatable at a speed matched to the maximum telegraphing speed, for example 100 Baud. The arrangement is such that upon shifting to the lower speeds only the waiting time between releases is changed. However, the sequences of movement of the printer itself correspond in each case to the 100 Baud speed.

This arrangement enables the changing of the operating speeds by the simple means of effecting a change in the impulse frequency which can be readily accomplished in a simple manner by making adjustable part of the frequency divider stages between the crystal controlled matrix generator O, which operates at the frequency of 24kHz. The adjustable part containing the divider stages T1, T2, T3 and T4 can be utilized jointly for transmitting and receiving when necessary. In an advantageous embodiment of the invention it is contemplated that in the case of a changeover to local operation by means of the contacts LK the maximum speed, for example 100 Baud is automatically put into operation, whereby such selection is independent of the position of the speed selector switch GW for the line operation. This arrangement avoids the possibility of the connection of an unsuitable speed when switching back from local to line operation as a result of carelessness on the part of the operator.

The lower portion of FIG. 1 illustrates the frequency divider circuits and the means for changing the operating speeds. In this embodiment of the invention, the flip stages T2 and T3 are arranged to provide a frequency division either in a ratio of 1:3 or 1:4 so that when taken with the flip stage T4, the ratios are 1:3 and 1:2 for the 75 Baud speed and a ratio of 1:4 and 1:2 for the 50 Baud speed. At a speed of 100 Baud, the stage T1 is shunted and stages T2 and T3 are circuited to form a divider having a 1:3 ratio. The frequency divider FT may be permanently associated with the receiver, while the divider stages T1 to T4 can be employed jointly for receiver and transmitter. The divider stages T1 to T4 are arranged to continuously pass impulses while the divider FT is operated in a start/stop manner. The arrangement is such that the start of the divider FT cannot begin at the instant of the start step flank, but only at the subsequent impulse at the output of the flip stage T4, which provides advantages as subsequently explained.

It will be appreciated that as the impulse associated with the center scanning of the starting step is derived through the flip stage T4 while the reference flank for distortion measurements is derived from the starting flank of the starting step, there results a scanning error of $$V_{\text{max.}}=\frac{\text{step frequency}}{\text{impulse frequency}}$$

At 100 Baud, stage T1 is inoperative and the transmission ratios are 1:3 for stages T2/3 and 1:2 for stage T4 or an overall ratio of 1:6 . At a frequency of 24kHz. with a 1:6 reduction, an impulse frequency will be present at T4 of 4kHz.

Thus the maximum distortion is $$V_{\text{max.}}=\frac{1}{40}=2.5\% \left\{V_{\text{max.}}=\frac{100\text{ Hz.(Bd)}}{4000\text{ Hz.}}=\frac{1}{40}=2.5\%\right\}$$

in other words, the inherent structure of the receiver is such that it has a scanning phase of 2.5 percent. It must be taken into consideration in this respect that with a divider similar to FT, which is not corrected, the impulse can shift only after the arrival of the starting step flank which results in a one-sided distortion of 2.5 percent. Such one-sided condition can be eliminated by so presetting the divider FT that until the first impulse flank ST it will only count to 19 and not to 20, and thereby places the impulse in an intermediate position. The center scanning then is advanced by half a generator phase and a symmetrical scanning error of ± 1.25 percent results.

Figure 3A:
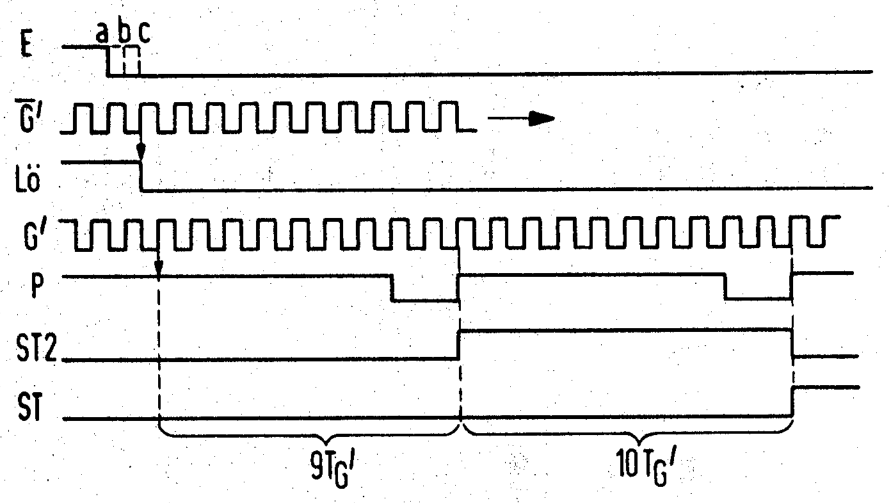
Figure 3B:
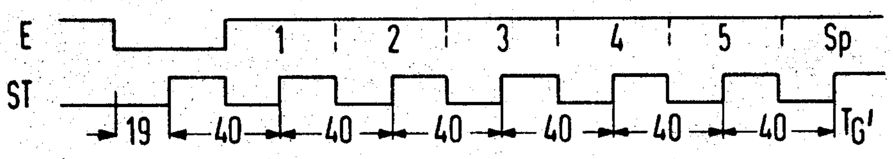
Figure 3C:
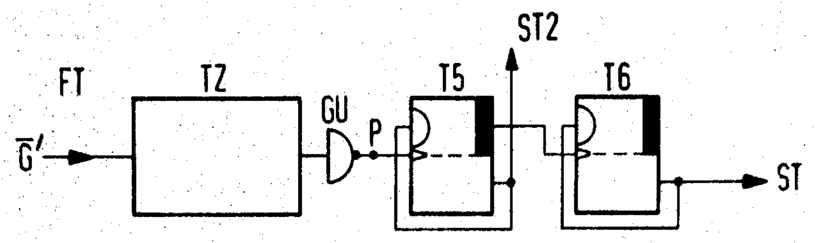
FIG. 3*c* is a block diagram illustrating in greater detail the divider circuit FT of FIG. 1.

The manner in which the one-sided scanning error is eliminated will be readily ascertained in connection with FIGS. 3*a*, 3*b* and 3*c* . Referring to FIG. 3*c*, the circuit arrangement of the divider FT comprises a 10-digit divider TZ and two additional divider stages T5 and T6, which in each case divide the impulse frequency received at their input in a ratio of 1:2 . If the divider FT is reset or erased, the rest position illustrated in FIG. 3*a* will exist. If a starting step now arrives, the erasure signal LO is eliminated with the following positive impulse of the signal G. As the 10-digit divider TZ is at this time receiving a negative impulse flank, it will not begin to operate in each case for a period of ½ G′ after removal of the erasure criterion. The start of the beginning of the operation of the divider is referred to the negative flank of G which corresponds in time to the positive flank of G′. The shifting gate GU in FIG. 3 is necessary in order to obtain the subsequent phase which is initiated by the positive flank of the input signal end of the cycles of the 10-digit divider TZ, said phase being a positive flank. The 10-digit divider TZ thus initially counts 9 impulses of signal G′ and from the second cycle on it counts 10 impulses of signal G. As illustrated in FIG. 3*b*, the step length of the input steps is 40 impulses of the signal G′. The first scanning flank of the impulse signal ST must, in order to attain a scanning error of 0 percent, occur after 20 impulses of signal G. As explained above, in connection with FIG. 3*a*, the first flank already has appeared after 19 impulses of signal G′ since the beginning of the start of the divider FT, that is, one impulse too early. If a starting step arrives at moment *b* according to FIG. 3*a*, the divider FT can start by one impulse of signal G′ later so that the first scanning flank occurs after 19 +1 =20 impulses of signal G′ since the arrival of the starting step and thus represents a scanning error of 0 percent.

As will be apparent from FIG. 3*a*, the two largest scanning errors occur upon arrival of the starting steps at moments *a* or *c* . At moment *a* at the time of 20 impulses of signal G′, the time of half an impulse period of signal G is added, while at the time *c* half an impulse period of signal G is eliminated. The scanning error thus can amount to 1.25 percent at the most in the leading or trailing direction.

In order to switch to 50 Baud, the logic signal "0" is applied to terminal E50 by grounding with a logic "1" being applied to the other input terminals E100 and E75. Consequently, at 50 Baud, with "0" at input E50 and "1" at inputs E75 and E100 all divider stages T1 to T4 and frequency divider FT are operative and the generator impulse frequency G is present at the impulse input of the divider stage T1. The gate G4 is blocked by gates G1 and G2 while G5 is open so that the output of the flip stage T1 is connected over gate G5 with the input of the flip stage T2. In this case, flip stages T2 and T3 are cooperable as frequency dividers for a ratio of 1:3 . As a result, the gate G6 is opened over gates G8 and G7 with the logic signal 1 remaining applied to the input E75. As a result, there appears at the output of T4 a frequency of 2kHz.

When switching to 75 Baud, the logic signal "0" is placed on the input E75 and the logic signal "1" is placed on the other inputs E100 and E50. The stage T1 is rendered inoperative over gates G1, G2, G3 and gate G4 is opened over gates G1 and G2 so that the generator impulse G is directly applied to the gates G4 and G5 without division and thus to the divider stages T2 and T3. The divider stage T1 thus is bypassed. Gate G6 is blocked by way of gates G8 and G7 whereby the flip stages T2 and T3 are circuited as dividers in a 1:4 ratio. The resulting output frequency at T4 thus is 3kHz.

If the receiver is to be operated at 100 Baud, the logic signal "1" is applied to inputs E50 and E75 with the frequency G of the impulse transmitter "O" reaching the flip stages T2 and T3 over the gates G4 and G5. Gate G6, however, is opened over gates G8 and G7 and flip stages T2 and T3 and thus circuited as a divider with a 1:3 ratio. The resulting output frequency thus is 4kHz.

To automatically provide a speed of 100 Baud for local operations, the logical signal "0" is applied to gates G2 and G7 by closing contacts LK thus rendering the setting of the switch GW ineffective. In this connection, it is immaterial which speed happens to be connected at the particular time.

OPERATION

To facilitate an understanding of the operation of the circuit illustrated in FIG. 1, a complete sequence of operations will be given. Thus, assuming that the operating speed is to be 100 Baud, the frequency divider circuits will be operative as previously described for such operating speed whereby the output from the stage T3 will be 8kHz. and at the output of T4 a frequency of 4kHz. All flip stages will be in the rest position and all inputs and the output of gate G9 will have a "1" thereat. The same is also true at the point E, input of stage KE and all inputs and outputs of gates G17, G10, G14 as well as at one input and the output of the OR gate G12.

Upon receipt of a start pulse, a "0" appears at the point E, preparation input of stage KE, output of gate 15, corresponding input of gate G17, output of G17, and through gates G10, 14 and 12 to point B and stage KL, which flips upon receipt of a subsequent triggering impulse over line G. Flipping of KL results in the application of "0" to the other input of gate G17 to maintain a "0" on the input of KL. Following release of divider FT, upon flipping of KL the first impulse on line ST2 will result in flipping of stage KE if "0" is still present at point E at this time. Upon flipping of KE an impulse is transmitted through gate G13 and gate G15 to the input of K5 irrespective of whether or not "0" still remains at point E, and upon simultaneous appearance of an impulse from the gate G15 and line ST′ to stage K5, the latter will be triggered. Successive impulses on the line ST′ will transfer the "0" through the following stages of the shift register until the stage KA*n* is flipped, which will cause the application of a blocking potential through gate G22 to the triggering input of stages K1—K5 and readying KS*p* which will flip upon receipt of the next impulse over the line ST, in turn readying gate G16 which upon the next impulse on line ST2 over gate G11 will be operative through gate G12 to return a "1" on the preparatory input of KL and upon appearance of the next impulse over the line G will erase or reset stage KL, in turn erasing or resetting all of the respective stages to their rest positions. As will be apparent from a reference to FIG. 2*a*, the printing period is represented substantially by the actuated duration of stage KA*n* which is not reset until the stage KL has been reset to again place a "1" on the output SL*o* thereof.

Although the description of this invention has been given with respect to a particular embodiment, it is not to be construed in a limiting sense, as it will be apparent, that the foregoing description concerns only a preferred embodiment thereof and that various immaterial modifications and changes may be made therein by those skilled in the art without departing from the spirit and scope of the novel concepts of this invention.

We claim:

1. In a teleprinter device, utilizing a receiver formed from electronic circuits, for use with an electromechanical printing mechanism, which is adjustable to various operating speeds, with the cyclic frequency being produced by a correspondingly adjustable frequency generator, the combination of a cyclic receiver constructed as a shift register, having start and reset circuits, means operatively connecting said frequency generator to said shift register for supplying shift impulses thereto, and means operatively connecting said frequency generator to the start and reset circuits to supply control impulses thereto at a frequency twice that of the shift impulses, and a blocking circuit operatively connected to said shift register operative, following entry of the last symbol step, to prevent further change in the shift register until release thereof in response to a control impulse, whereby the data is stored in the register, from the middle of the last symbol step, for a period of 1.25 step lengths.

2. A teleprinter device according to claim 1, wherein said frequency generator comprises a crystal controlled oscillator and a plurality of cooperable divider stages, at least one of said divider stages including switch means for selectively varying the operation thereof to provide impulses for the selective operation of said device at any one of a plurality of telegraph speeds.

3. A teleprinter device according to claim 2, comprising in further combination, means including additional switch means connected to said divider stages, operative when said additional switch means is set for "local operation" to set said divider stages for the maximum operating speed, independently of the setting of said first speed-varying switch means.

4. A teleprinter device according to claim 2, wherein the maximum speed corresponds to the maximum settable telegraph speed of such a printing mechanism, whereby such printing mechanism may permanently operate at such maximum speed, with merely the waiting time between the releases being increased at the lower speeds of said device.

5. A teleprinter device according to claim 1, wherein said frequency generator comprises a crystal controlled oscillator and a plurality of cooperable divider stages which are operative to provide said step impulse frequency, said double-step frequency and impulses of a higher frequency multiple thereof, and means responsive to said higher frequency impulses, operatively connected to said shift register for testing, after a predetermined fraction of a step length, for continued presence of a start step, and if the latter is absent, to initiate return of the respective initially actuated circuits to their rest positions.

6. A teleprinter device according to claim 5, comprising in further combination, means cooperable with said testing means for subsequently supplying to the input of said shift register, in the event said test circuit finds a continued presence of a start step at the end of said predetermined step fraction, an impulse independently of then condition of the input line.

7. A teleprinter device according to claim 1, wherein said frequency generator comprises a crystal controlled oscillator and a plurality of cooperable divider stages, at least one of said divider stages being constructed for start-stop operation and arranged for disposition, upon a stopping thereof, into such an initial position that with each start of the receiver the first timing impulse period is shortened by a reduction in the transmission ratio for the first transmission cycle, operative to convert a trailing distortion into a bilateral distortion of half the maximum absolute value of the trailing distortion.